United States Patent
He et al.

(10) Patent No.: US 7,916,349 B2
(45) Date of Patent: Mar. 29, 2011

(54) COLOR PIXEL ERROR DIFFUSION IN A CMYK INPUT COLOR SPACE

(75) Inventors: Zhen He, Sherwood, OR (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 316 days.

(21) Appl. No.: 12/258,494

(22) Filed: Oct. 27, 2008

(65) Prior Publication Data
US 2010/0103465 A1   Apr. 29, 2010

(51) Int. Cl.
H04N 1/40 (2006.01)
G06K 15/00 (2006.01)
G06K 1/00 (2006.01)
G03F 3/08 (2006.01)

(52) U.S. Cl. ........ 358/3.03; 358/1.9; 358/518; 358/3.06

(58) Field of Classification Search .......... None
See application file for complete search history.

(56) References Cited

U.S. PATENT DOCUMENTS

| | | | |
|---|---|---|---|
| 5,010,814 A * | 4/1991 | Shishikura | 101/211 |
| 5,621,546 A | 4/1997 | Klassen et al. | |
| 5,687,300 A * | 11/1997 | Cooper | 358/1.9 |
| 5,748,785 A | 5/1998 | Mantell et al. | |
| 5,784,496 A | 7/1998 | Mantell | |
| 5,991,512 A * | 11/1999 | Shaked et al. | 358/1.9 |
| 6,014,233 A | 1/2000 | Fan et al. | |
| 6,157,469 A | 12/2000 | Mestha | |
| 6,250,733 B1 | 6/2001 | Yao et al. | |
| 6,501,564 B1 | 12/2002 | Schramm et al. | |
| 6,870,644 B2 | 3/2005 | Schramm et al. | |
| 7,164,498 B2 * | 1/2007 | Van Bael | 358/1.9 |
| 7,483,169 B2 * | 1/2009 | Murakami | 358/1.9 |
| 7,499,203 B2 | 3/2009 | Yao | |
| 2006/0132825 A1 | 6/2006 | Czudak et al. | |
| 2006/0215189 A1 | 9/2006 | Yao | |
| 2006/0227394 A1 | 10/2006 | He | |
| 2006/0238800 A1 | 10/2006 | Czudak et al. | |
| 2007/0165252 A1 * | 7/2007 | Sasaki | 358/1.9 |
| 2008/0239338 A1 * | 10/2008 | Bailey et al. | 358/1.9 |
| 2010/0020339 A1 | 1/2010 | He | |
| 2010/0259802 A1 | 10/2010 | He | |

OTHER PUBLICATIONS

U.S. Appl. No. 12/025,838, filed Feb. 5, 2008, He. U.S. Appl. No. 12/025,842, filed Feb. 5, 2008, He.
U.S. Appl. No. 12/420,494, filed Apr. 8, 2009, He.
Shaked et al., "Ink Relocation for Color Halftones", © Hewlett-Packard Company, 1999, p. 1-11.
Non-Final Office Action mailed Nov. 15, 2010, U.S. Appl. No. 12/025,842.

* cited by examiner

*Primary Examiner* — Twyler L Haskins
*Assistant Examiner* — Barbara D Reiner
(74) *Attorney, Agent, or Firm* — Philip E. Blair; Fleit Gibbons Gutman Bongini & Bianco P.L.

(57) ABSTRACT

What is disclosed is a system and method for diffusing pixel error in a halftoning process in a color management system. The present method divides a modified CMYK input into a real and imaginary portions. The real portion is the coverage achieved by a physically realizable positive dot. The imaginary portion comprises a an imaginary negative dot and an imaginary excess dot. Each of these dots are processed separately, on a per-pixel basis, in a novel CMYK to CMYKKpRGB conversion discussed in detail herein. Hierarchical thresholding is preformed on the conversion output to produce a high-quality halftone result. A cumulative pixel error sum is derived therefrom and combined with the input CMYK coverages of a next pixel. All pixels are processed. The halftone output generated hereby has the pixel error compensated. Other embodiments are provided.

20 Claims, 6 Drawing Sheets

COLOR PIXEL ERROR DIFFUSION IN A CMYK INPUT COLOR SPACE

TECHNICAL FIELD

The present invention is directed to systems and methods for diffusing color pixel error in a halftoning process in a color marking device capable of dot-on-dot printing, such as solid ink devices.

BACKGROUND

Halftoning is the process of representing a continuous tone image by a bi-level image such that, when viewed from a suitable distance, the bi-level image gives the same impression as the contone image. Halftoning techniques are widely employed in the printing and displaying of digital images and are necessary because the physical processes involved are binary in nature or because the processes being used tend to be restricted to binary operation for reasons of cost, speed, memory, or stability in the presence of process fluctuations. The general idea behind halftoning is, by varying the density of the dots used to print the individual primary colors, Cyan, Magenta, Yellow and Black (CMYK), any particular shade can be reproduced. By varying dot density, the eye perceives a shade somewhere between the solid color and the color of the background paper. The effect has its limits. When the dots get too small or are spaced too far apart, the eye starts perceiving individual dots again.

A pattern of dots used to produce a particular shade of color is known as a halftone screen. A halftone screen describes the set of values which together make up the set of thresholds to be applied in a halftone screening process to generate the output halftone patterns. A single-center halftone screen uses the entire area for one cell, or tile, only. The resolution of a halftone screen is defined by the number of lines of dots in one inch, measured parallel with the angle of the halftone screen. The higher the resolution of the halftone screen, the greater the detail that can be reproduced. Higher resolution requires a higher quality printing processes, otherwise the printed output image may suffer from posterization. Posterization occurs when a region of an image with a continuous gradation of tone is replaced with several regions of fewer tones, resulting in an abrupt change from one tone to another. This creates the visual effect one notices when a relatively small image has been blown up to the size of a poster. Therefore it is important to match screen resolution to the desired printing process. Further, when different halftone screens meet, a number of distracting visual effects can occur. These include the edges being overly emphasized as well as a moiré pattern. These problems can be reduced by rotating the halftone screens in relation to each other.

Digital halftoning utilizes a raster image or bitmap within which each monochrome element or pixel is turned ON/OFF (dot or no dot). Raster type printers employ halftoning to transform contone image data to print data that can be rendered using an array of substantially uniform dots. For example, 24-bit/pixel contone data can be halftoned to a plurality of single color 1-bit/pixel bitmaps. The collection of individual single color bitmaps forms the image.

The digital halftone cell contains groups of monochrome pixels within the same-sized cell area. Each equal-sized cell relates to a corresponding area (size and location) of the contone input image. Within each cell, the high frequency attribute is a centered variable-sized halftone dot composed of ink or toner. The ratio of the inked area to the non-inked area of the output cell corresponds to the luminance or gray-level of the input cell. From a suitable distance, the human eye averages both the high frequency apparent gray-level approximated by the ratio within the cell and the low frequency apparent changes in gray-level between adjacent equally-spaced cells and centered dots.

Color pixel error diffusion is a popular halftoning method due to its detail preservation and moiré resistance. Error diffusion methods in a color environment can be classified into two types, vector error diffusion and scalar error diffusion. Vector error diffusion is often considered to be better in image quality because it achieves higher halftone quality compared to the channel-independent scalar color error diffusion due to the better correlation among CMYK color planes. However, it requires significantly more computation and can introduce artifacts into the output device space due to an accumulation of the errors.

Halftoning in a CMYK domain does not necessarily result in a well-behaved inter-color correlation among secondary colors (RGB). Consequently, noticeable increases in graininess can be observed when significant amounts of secondary color dots are used to achieve the determined input ink coverages. Therefore, explicit secondary color dot control is desirable to achieve uniform dot distribution. It is also desirable to position the color dots uniformly in the very highlight and very dark shadow areas due to a requirement of long-distance spatial correlation. Performing color error diffusion in a memory efficient manner is a challenge since many of the conversions and transformations are performed in an application specific integrated circuit (ASIC), or the like, where resources can be limited.

Accordingly, what is needed are increasingly sophisticated systems and methods for performing color error diffusion in an efficient manner while still achieving a high-quality dispersed-dot halftone output result.

BRIEF SUMMARY

What is provided are a novel system, method, and computer program product for diffusing pixel error in a halftoning process in a color management system. The present method computes and diffuses pixel error in an input CMYK color space via a pixel-based adaptive algorithm processing CMYK ink coverages on a per-pixel basis. In order to effectuate the above, the present method introduces imaginary dot coverages and provides a conversion to handle the real and imaginary dots in an elegant manner. Results demonstrate that the present method effectively diffuses pixel error and provides a comparable high-quality halftone output result. The method is computationally efficient and thus can be implemented in a bit-constrained environment such as an ASIC or FPGA placed in the image path of a color marking device or color management system.

In one example embodiment, an input CMYK ink coverage is received for each pixel in a color image. Optionally, the input CMY are clipped to insure that no colorant overlaps with composite K. The present pixel-based adaptive processing method computes an error amount for a next pixel based on values determined on a previous iteration. A temporary CMYK variable carries the error from a previous iteration into a next iteration. For each pixel, the following steps are performed. The temporary CMYK is added to the current pixel's input CMYK to produce a modified $C_i M_i Y_i K_i$ for the current iteration. The modified $C_i M_i Y_i K_i$ are divided into a real and an imaginary portion. The real portion comprises a positive portion, $C_p M_p Y_p K_p$, defined by a real amount of coverage, in the range of 0-100%, of a physically realizable "positive" dot. The imaginary portion comprises a negative portion and an excess portion. The negative portion, $C_nM_nY_nK_n$, defines an amount of coverage, less than 0%, of an imaginary "negative" dot. The excess portion, $C_eM_eY_eK_e$, defines an amount of coverage, greater than 100%, of an imaginary "excess" dot. An amount of CMYK is next determined for each of the dots. In one embodiment, determining the amount of CMYK for each of the dots involves the following. An amount of $C_pM_pY_p$ is determined for the positive dot based on a maximum of the modified $C_iM_iY_i$. An amount of $C_nM_nY_n$ for the negative dot is determined as the amount of CMY sufficient to cancel the positive dot. A maximum capacity of a space S available, sufficient to accommodate C, M, and Y colorants at the current pixel location, is determined. An amount of $C_eM_eY_e$ for the excess dot is determined by the amount of CMY which cannot be settled inside of space S. The $C_eM_eY_e$ of the excess dot is subtracted from the positive dot. Thereafter, the determined amounts of CMY for each of the dots are adjusted by removing their respective K to determine for each dot an amount of residual space remaining for C, M, and Y colorant. An amount of RGB is determined for each dot from their respective CMYK amounts. This produces a CMYKRGB for each dot. These are combined to produce a CMYKK$_p$RGB output. A hierarchical thresholding technique is performed on the CMYKK$_p$RGB output generated by the conversion routine. Hierarchical thresholding produces a (CMYKK$_p$RGB)$_h$ halftone result. An inverse transformation maps the halftone result to a (CMYK)$_h$ halftone result for the current pixel. This result is outputted. A determination is made as to a difference between the halftone result and the output of the CMYK to CMYKK$_p$RGB conversion. This difference produces as $\Delta$CMYKK$_p$RGB which represents the amount of pixel error for the current iteration. An inverse transform maps the $\Delta$CMYKK$_p$RGB to a $\Delta$CMYK. The $\Delta$CMYK is fed through a low-pass filter to reduce noise sensitivity. The $\Delta$CMYK is assigned to the temporary CMYK which carries these values into the next iteration. The temporary CMYK are combined with the input CMYK of the next pixel to produce a modified $C_iM_iY_iK_i$. Processing continues for all pixels.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
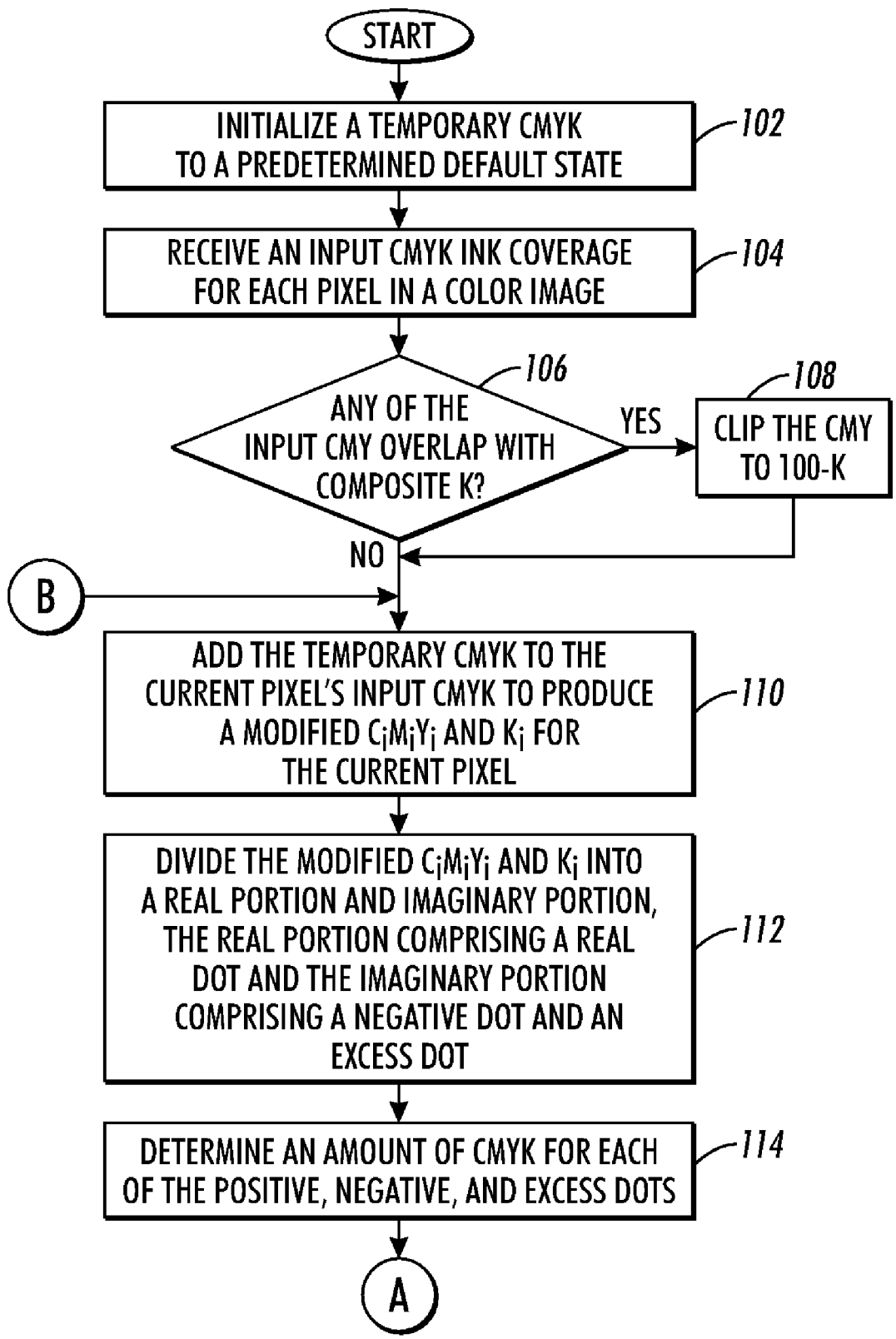
FIG. 1 is a flow diagram of one embodiment of the present method for diffusing pixel error in a halftoning process in a color management system.

What is provided are a system and method for hierarchical color error diffusion in a CYMK input color space. The present method diffuses pixel error in an input CMYK color space via a pixel-based adaptive processing algorithm. Pixel error in CMYK color space is computed on one iteration and added to the input CMYK on a next iteration to generate a modified $C_iM_iY_iK_i$ which is processed as input for the current iteration. The modified $C_iM_iY_iK_i$ of the current iteration is provided as input to a conversion module which produces a CMYKK$_p$RGB output. The CMYKK$_p$RGB output is provided to a hierarchical thresholding module which generates a (CMYKK$_p$RGB)$_h$ halftone result. An inverse transform maps this halftone result to a (CMYK)$_h$ halftone for this pixel. An amount of error for the current pixel is determined by a difference between the generated (CMYKK$_p$RGB)$_h$ halftone result and the CMYKK$_p$RGB output produced by the conversion module. This produces a $\Delta$CMYKK$_p$RGB. An inverse transform maps the $\Delta$CMYKK$_p$RGB to a $\Delta$CMYK. The $\Delta$CMYK is filtered and added to the input CMYK of the next pixel to produce the modified $C_iM_iY_iK_i$ for the next iteration. All pixels are processed accordingly. The (CMYK)$_h$ halftone result has the color pixel error diffused.

It should be understood that one of ordinary skill in this art would be readily familiar with the many facets of color science such as, for example, halftones and halftoning methods, color transformation algorithms and processes, color pixel values, and other related techniques and algorithms common to the color science arts. Additionally, one of ordinary skill in this art would also be familiar with mathematical techniques used in the manipulation and transformation of color. One of ordinary skill would also be knowledgeable about software programming techniques sufficient to implement the functionality described in detail herein in their own color management systems without undue experimentation.

A pixel, as used herein, refers to the smallest segment into which a printed image is divided and may also refers to a signal associated with a particular position in an image. Each pixel can be a bit in binary form, a gray scale value, or a set of coordinates in the color space of the image. Pixel values can be converted into CIELAB color space by a RBG to Lab converter to obtain luminance (L) and chrominance (a,b) values. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. The relationship of brightness to luminance is non-linear, approximately a cube root.

Primary colors are understood to be: Cyan (C), Magenta (M), Yellow (Y), and Black (K). Secondary colors are understood to be: Red=(M+Y), Blue=(C+M), and Green=(C+Y). For CMYK printing, dot visibility decreases in the order of brightness given by: K, B, R, G, M, C, and Y. The order of brightness may vary depending on the color composition of the inks being used.

A color marking device refers to a color output device capable of rendering text, graphics, images, plots, graphs, and the like, for visual examination. Such devices include production printers, xerographic devices, image reproduction equipment, color monitors, displays, and any device capable of outputting a color signal. To render a color image is to output the image to a color output device. Color output devices receive a color signal of the image and reduce the signal to viewable form. Image reduction includes the process of marking a substrate with colorants to form the image from the visual integration of the colorants on the substrate, or to display the image on an image display device. Devices capable of dot-on-dot printing include products, such as ink-jet devices, which operate by propelling variably-sized droplets of liquid or molten material (inks, pigments, etc.) mixed with a colorant onto a media substrate, such as paper. The output image is formed from the visual integration of the colored dots. Appropriate sizing operations have to be performed for images where the input resolution in terms of scanned pixels is different from the output resolution in terms of printed pixels.

Reference is now made to FIG. 1 which is a flow diagram of one embodiment of the present method for diffusing pixel error in a halftoning process in a color management system.

In the example embodiment, since the computations for a next pixel are based on an output determined on a previous iteration, at 102, a temporary CMYK is initialized to a default state to handle the first iteration. At 104, an input CMYK ink coverage is received for each pixel in a color image. At 106, a determination is made whether any of the input CMY are greater than 100-K. If so, at 108, the values are clipped. At 110, the temporary CMYK is added to the current pixel's input CMYK to produce a modified $C_iM_iY_iK_i$ for the current iteration. At 112, the modified $C_iM_iY_iK_i$ are divided into a real and an imaginary portion. The real portion comprises a positive portion, $C_pM_pY_pK_p$, defined by an amount of coverage, in the range of 0-100%, achievable by a physically realizable positive dot. The imaginary portion comprises a negative portion and an excess portion. The negative portion, $C_nM_nY_nK_n$, defines an amount of coverage, less than 0%, of an imaginary negative dot. The excess portion, $C_eM_eY_eK_e$, defines an amount of coverage, greater than 100%, of an imaginary excess dot. At 114, an amount of CMYK is determined for each of the positive, negative, and excess dots. In one embodiment, determining an amount of CMYK for each of the dots involves the following. First, an amount of $C_pM_pY_p$ is determined for the positive dot based on a maximum of the modified $C_iM_iY_i$ input values. An amount of $C_nM_nY_n$ is then determined for the negative dot. The amount of coverage of the negative dot is the amount of CMY sufficient to cancel the coverage area of the positive dot. A maximum capacity of a space S, available to accommodate C, M, and Y colorants at the current pixel location, is determined. An amount of $C_eM_eY_e$ for the excess dot is determined. The excess dot coverage is the amount of CMY coverage which cannot be settled inside of space S. The amounts of CMY for each dot are adjusted by removing their respective amounts of K to determine an amount of residual space remaining for each C, M, and Y colorant.

Figure 2:
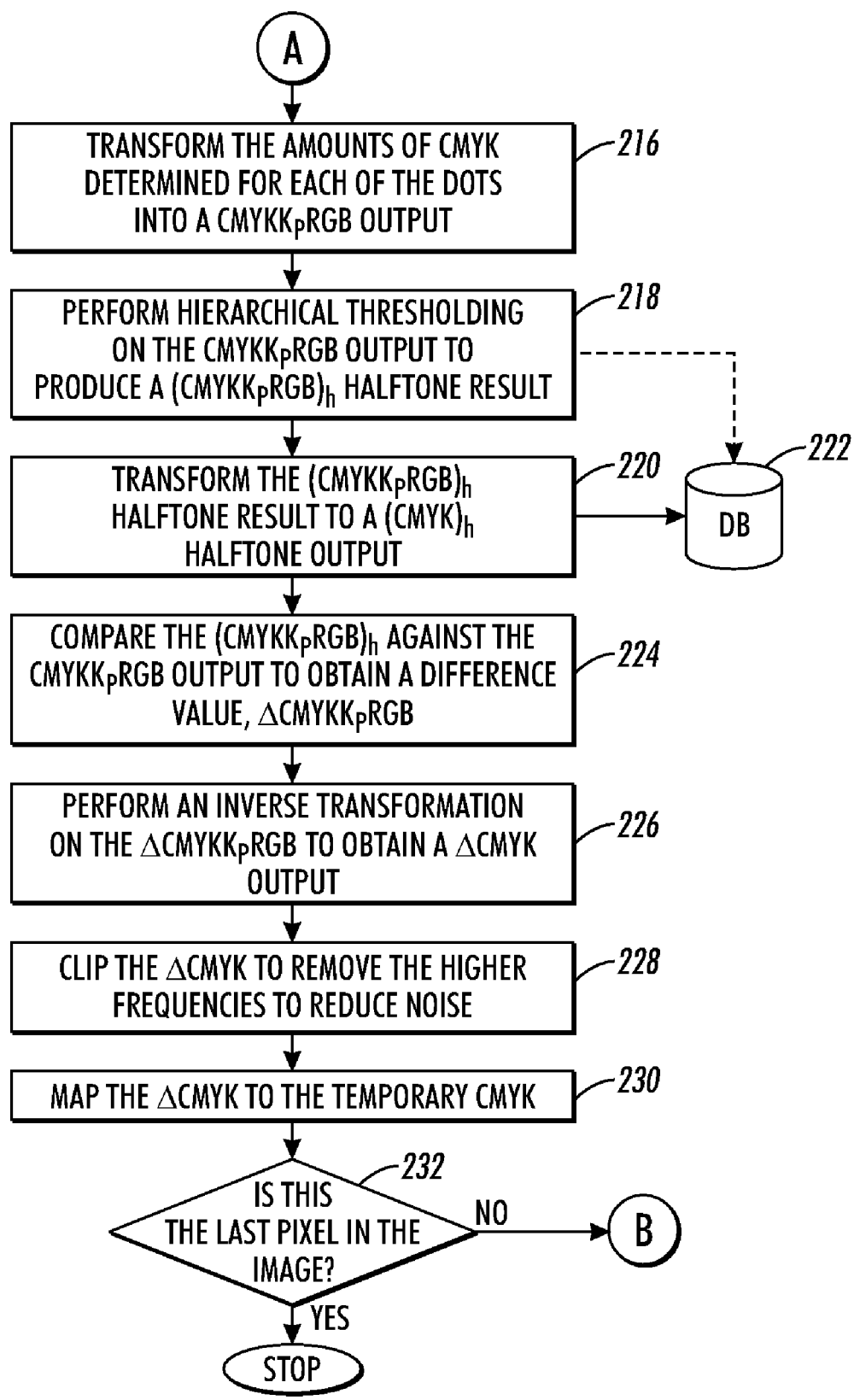
FIG. 2 is a continuation of the flow diagram of FIG. 1 with processing continuing with respect to node A.

Reference is now made to FIG. 2 which is a continuation of the flow diagram of FIG. 1 wherein the flow continues with respect to node A.

At 216, the determined amounts of CMYK for each of the dots are transformed from a 4-channel CMYK domain to an 8-channel domain. In one embodiment, the transformation involves determining an amount of RGB for each dot based on the dot's respective CMY and combining the CMYK and RGB for each of the dots. This produces a CMYKRGB for each dot. These are combined to generate a $CMYKK_pRGB$ output. At 218, hierarchical thresholding is performed on the $CMYKK_pRGB$ output. Hierarchical thresholding produces a $(CMYKK_pRGB)_h$ halftone result for the current pixel. At 220, the $(CMYKK_pRGB)_h$ halftone is transformed to a $(CMYK)_h$ halftone through an inverse transformation. The $(CMYK)_h$ halftone result for the current pixel can then be sent to database 222 for storage and subsequent retrieval. The $(CMYKK_pRGB)_h$ halftone result can also be stored to storage device 222. At 224, a determination is made as to a difference between the $(CMYKK_pRGB)_h$ halftone and the $CMYKK_pRGB$ output (before and after hierarchical thresholding). This difference, denoted $\Delta CMYKK_pRGB$, represents the amount of pixel error determined on the current iteration. At 226, an inverse transformation maps the $\Delta CMYKK_pRGB$ to a $\Delta CMYK$ output. The $\Delta CMYK$ contains the error. At 228, the $\Delta CMYK$ is low-pass filtered to reduce noise. At 230, the $\Delta CMYK$ are assigned to the temporary CMYK for carry-over to the next iteration. At 232, a determination is made whether any more pixels remain to be processed. If not, then processing ends. If yes, then processing continues with respect to node B of FIG. 1, wherein the temporary CMYK are combined with the input CMYK of the next pixel to produce modified $C_iM_iY_iK_i$ to be processed. Processing continues until all pixels have been processed and a $(CMYK)_h$ output result has been produced for the entire image.

Figure 3:
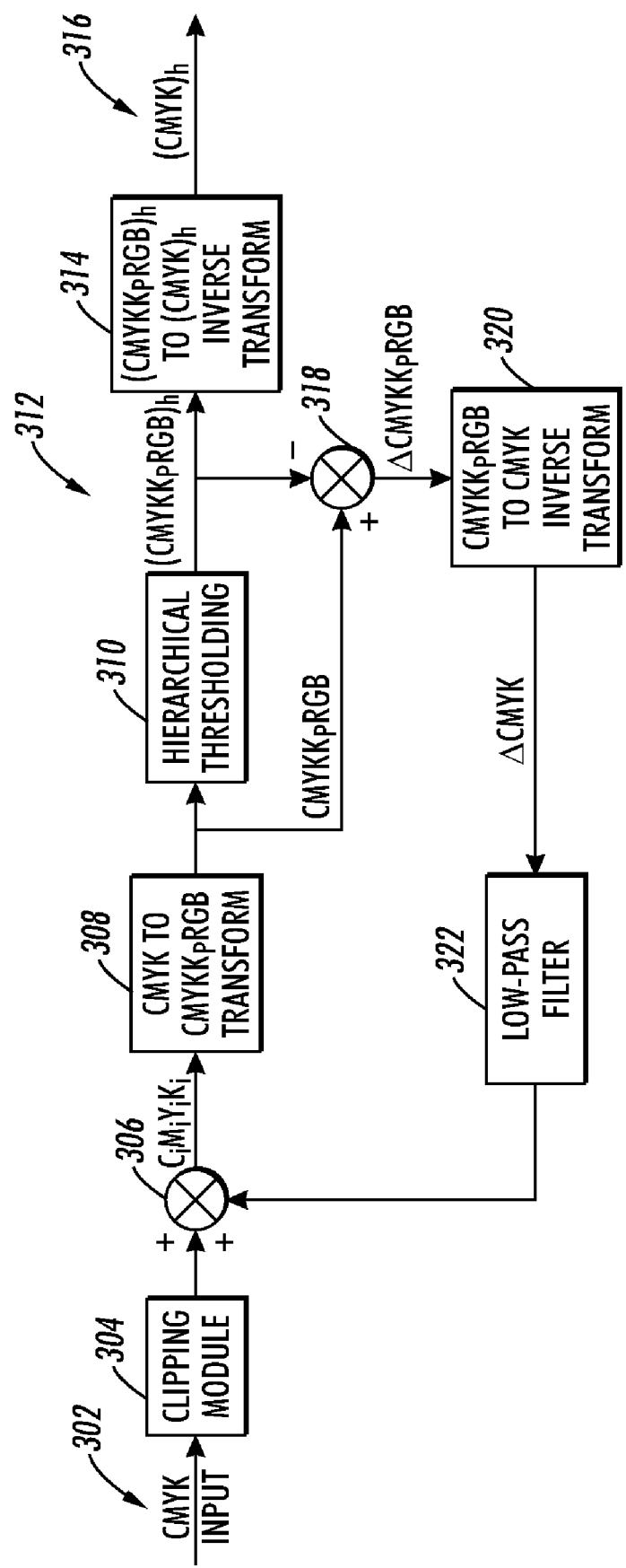
FIG. 3 is a block diagram of one example embodiment of the present pixel error diffusion method.

Reference is now made to FIG. 3 which illustrates one example embodiment of a block diagram of the present pixel error diffusion method.

An input CMYK ink coverage 302 of a pixel of an image is received. Methods of obtaining CMYK ink coverages for pixels are well known. CMYK values often take the form of digital signals obtained from an imaging device, such as a scanner. The input CMYK signals can be received from a wide variety of imaging devices and networked sources, or retrieved from memory or a storage device.

Clipping module 304 determines whether any of the input C, M, and Y overlaps with composite K. CMY values are clipped so that there is no overlapping. Clipping limits the maximum value of each CMY channel to 100-K. Any dot of overlapping C, M and Y is replaced by k colorant. Clipping the inputs eliminates any color dot overlapping with K dot, which is a waste of toner that can be avoided in practice. The present method is operable without ink-clipping although clipping simplifies computational complexity.

Adder 306, combines the input CMYK coverages with the temporary CMYK obtained from a previous iteration. It will be appreciated that, at the junction of adder 306, a condition exists wherein, on a first iteration of the feedback loop, temporary CMYK values are needed. These act as temporary storage which carries results of a current iteration over to a next iteration. At the bottom of each iteration, these variables are assigned the $\Delta CMYK$ outputs. These are combined with the input CMYK at the top of each iteration to produce the modified $C_iM_iY_iK_i$. In order to handle the instance of a first iteration where there is no previous carry-over, temporary variables are preferably initialized to a default state, such as zero. Otherwise, anomalies may be injected into the loop and unintended consequences may result. At the bottom of each iteration, the temporary CMYK values are assigned new $\Delta CMYK$ values. The addition of the temporary CMYK and the input CMYK of the current pixel produces a modified $C_iM_iY_iK_i$ which is input to CMYK to $CMYKK_pRGB$ conversion 308.

Conversion module 308 maps a CMYK to a CMYKK$_p$RGB to produce a CMYKK$_p$RGB output. To summarize, the CMYK to CMYKK$_p$RGB conversion first divides the modified C$_i$M$_i$Y$_i$K$_i$ into a real and an imaginary portion. The real portion comprises a positive portion, C$_p$M$_p$Y$_p$K$_p$, defined by the amount of coverage which can be achieved by a physically realizable "positive" dot. The imaginary portion comprises a negative portion, C$_n$M$_n$Y$_n$K$_n$, and an excess portion, C$_e$M$_e$Y$_e$K$_e$. The negative portion is defined by an amount of coverage (less than 0%) which can be achieved by an imaginary "negative" dot. The excess portion is defined by an amount of coverage (greater than 100%) achieved by an imaginary "excess" dot. The CMYK for each of these dots are processed separately within the conversion module (the 3 columns in FIG. 3). An amount of RGB is determined for each dot from their respective CMYK amounts. This produces a CMYKRGB for each dot. These are combined to generate a CMYKK$_p$RGB output from the conversion.

Hierarchical thresholding 310 takes the CMYKK$_p$RGB output and produces a (CMYKK$_p$RGB)$_h$ halftone result 312. It should be appreciated that the use of the subscript h is used to distinguish a halftone result from another result bearing identical letters. The use of a parenthesis is intended to mean that the whole value represents the halftone. For instance, (CMYKK$_p$RGB)$_h$ is the halftone result generated from a CMYKK$_p$RGB input. Methods for performing hierarchical thresholding are known in the arts. One method is disclosed in commonly owned U.S. application Ser. No. 12/025,842, "Hierarchical Color Error Diffusion In A CMYKRGB Domain", which is incorporated herein in its entirety by reference. Briefly, color components of an input CMYKRGB are hierarchically grouped into a plurality of subgroups based on relative dot visibility. More visible dot subgroups are halftoned earlier to achieve maximum uniform dot distribution. Halftoning methods are well known. Hierarchical thresholding produces a halftone result. It should be appreciated that a variety of hierarchical thresholding techniques can be realized within module 310.

Inverse transform module 314 maps the (CMYKK$_p$RGB)$_h$ halftone 312 to a (CMYK)$_h$ halftone output 316. One example transform, which maps an 8-channel to a 4-channel result, proceeds as follows:

$$C = K_p + G + B + C_p$$

$$M = K_p + R + B + M_p$$

$$Y = K_p + R + G + Y_p$$

$$K = K_p.$$

Alternatively, K$_{out}$=K$_{in}$. Inverse transformations from one domain to another are well understood in the color science arts. Other transformations are possible. The resulting (CMYK)$_h$ halftone 316 is stored or otherwise output for subsequent utilization in a variety of methods depending on the system wherein the present method is implemented.

Comparator 318, compares the output of transform module 308 with the halftone output of hierarchical thresholding module 310. A comparator determines a difference between two inputs by subtracting one input from another. In the present instance, comparator 318 subtracts the (CMYKK$_p$RGB)$_h$ halftone result from the CMYKK$_p$RGB output. This difference, ΔCMYKK$_p$RGB, contains the pixel error in 8-channel space.

Inverse transform 320 maps the ΔCMYKK$_p$RGB to a ΔCMYK. In the embodiment of FIG. 3, the ΔCMYK is provided to low-pass filter 322 to clip high frequencies. Such a filter is a 2-dimensional filter which reduces noise. Various filters find many uses in feedback loops. It should be appreciated that the use of a low-pass filter is intended to show one example embodiment which can improve the functionality of the illustrated feedback loop. However, it is not required for operation. One embodiment hereof does not implement a low-pass filter. Other variations use differing means in substitution for the low-pass filter depending on the complexity of the overall design wherein the present method is implemented.

Figure 4:
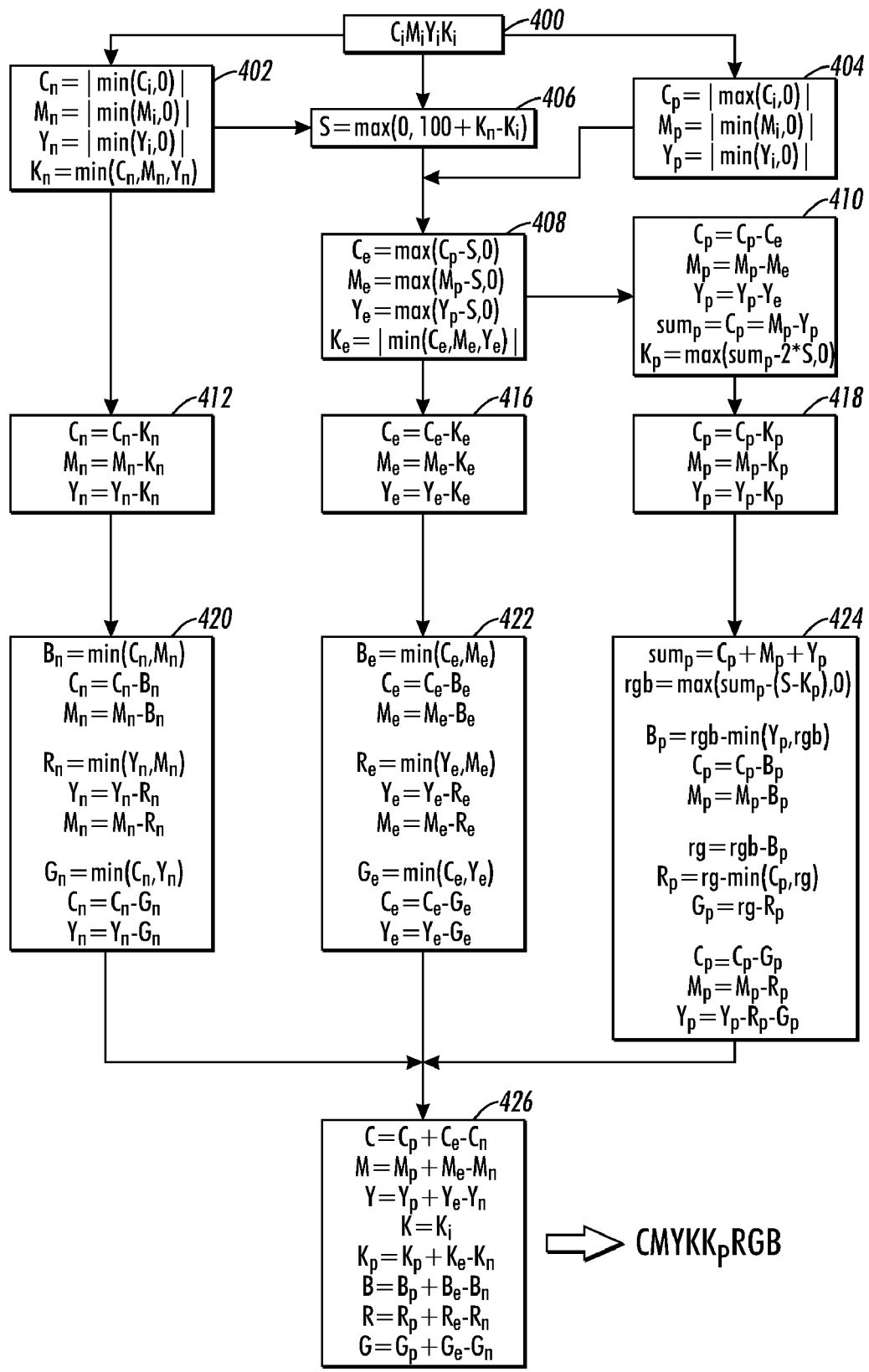
FIG. 4 is a flow diagram of one example embodiment of the CMYK to CMYKK$_p$RGB transform 308 of FIG. 3.

Reference is now being made to FIG. 4 which is a flow diagram of one example embodiment of the CMYK to CMYKK$_p$RGB transformation 308 of FIG. 3.

The following assumes that each input CMYK has been scaled to a value in the range from 0 to 100% inclusive. It should be appreciated that scaling the inputs to a defined range decreases computational complexity.

For the current iteration, the modified C$_i$M$_i$Y$_i$K$_i$ 400 are divided into a real and an imaginary portion. The real portion comprises a positive C$_p$M$_p$Y$_p$K$_p$ dot. The imaginary portion comprises a negative C$_n$M$_n$Y$_n$K$_n$ dot, and an excess C$_e$M$_e$Y$_e$K$_e$ dot. Each of the three dots are processed individually. The negative dot is processed on the left-most column of the flow diagram. The excess dot is processed in the middle column. The positive dot is processed on the right-most column.

The following describe the CMYK to CMYKK$_p$RGB conversion.

At 402, an amount of C$_n$M$_n$Y$_n$K$_n$ is determined for the negative dot. The CMY of the negative dot is based on a minimum of the modified C$_i$M$_i$Y$_i$. The amount of black K$_n$ of the negative dot is determined by the smallest CMY colorant.

$$C_n = |\min(C_i, 0)|$$

$$M_n = |\min(M_i, 0)|$$

$$Y_n = |\min(Y_i, 0)|$$

$$K_n = \min(C_n, M_n, Y_n).$$

At 404, an amount of C$_p$M$_p$Y$_p$ is determined for the positive dot:

$$C = |\max(C_i, 0)|$$

$$M = |\max(M_i, 0)|$$

$$Y = |\max(Y_i, 0)|.$$

At 406, a maximum capacity of a space S available to accommodate C, M, and Y colorants at the current pixel location. Space S is given by:

$$S = \max(0, 100 + K_n - K_i).$$

At 408, an amount of C$_e$M$_e$Y$_e$ is determined for the excess dot. The amount of C$_e$M$_e$Y$_e$ is the amount of CMY which cannot be settled inside of space S.

$$C_e = \max(C_p - S, 0)$$

$$M_e = \max(M_p - S, 0)$$

$$Y_e = |\max(Y_p - S, 0)|$$

$$K_e = |\min(C_e, M_e, Y_e)|.$$

At 410, the amount of C$_e$M$_e$Y$_e$ of the excess dot is subtracted from the positive dot in order to determine the portion of the positive coverage that can be accommodated with the available space at the current pixel.

$$C_p = C_p - C_e$$

$$M_p = M_p - M_e$$

$$Y_p = Y_p - Y_e$$

$$\text{sum}_p = C_p + M_p + Y_p$$

$$K_p = \max(\text{sum}_p - 2*S, 0).$$

At this point, CMYK values have been produced for each of the negative, positive, and excess dots. Thereafter, the determined CMY for each of the dots are adjusted by removing their respective amounts of K. This determines an amount of residual space remaining for each C, M, and Y for each dot.

At 412, the amount of $K_n$ is subtracted from each of the $C_n M_n Y_n$ of the negative dot.

$$C_n = C_n - K_n$$

$$M_n = M_n - K_n$$

$$Y_n = Y_n - K_n.$$

At 416, the amount of $K_e$ is subtracted from each of the $C_e M_e Y_e$ of the excess dot.

$$C_e = C_e - K_e$$

$$M_e = M_e - K_e$$

$$Y_e = Y_e - K_e.$$

At 418, the amount of $K_p$ is subtracted from each of the $C_p M_p Y_p$ of the excess dot.

$$C_p = C_p - K_p$$

$$M_p = M_p - K_p$$

$$Y_p = Y_p - K_p.$$

At this point, adjusted CMYK values have been produced for each dot.

In order to complete the CMYK to $CMYKK_p$RGB conversion process, RGB values must be produced from each of the negative, positive, and excess dots. Performing these sub-conversions entails using the adjusted CMYK values for each dot in a manner as follows.

At 420, the $R_n G_n B_n$ for the negative dot is determined by:

$$B_n = \min(C_n, M_n)$$

$$C_n = C_n - B_b$$

$$M_n = M_n - B_n$$

$$R_n = \min(Y_n, M_n)$$

$$Y_n = Y_n - R_n$$

$$M_n = M_n - R_n$$

$$G_n = \min(C_n, Y_n)$$

$$C_n = C_n - G_n$$

$$Y_n = Y_n - G_n.$$

At 422, the $R_e G_e B_e$ for the excess dot is determined by:

$$B_e = \min(C_e, M_e)$$

$$C_e = C_e - B_e$$

$$M_e = M_e - B_e$$

$$R_e = \min(Y_e, M_e)$$

$$Y_e = Y_e - R_e$$

$$M_e = M_e - R_e$$

$$G_e = \min(C_e, Y_e)$$

$$C_e = C_e - G_e$$

$$Y_e = Y_e - G_e.$$

At 424, the $R_p G_p B_p$ for the positive dot is determined by:

$$\text{sum}_p = C_p + M_p + Y_p$$

$$rgb = \max(\text{sum}_p - (S - K_p), 0)$$

$$B_p = rgb - \min(Y_p, rgb)$$

$$C_p = C_p - B_p$$

$$M_p = M_p - B_p$$

$$rg = rgb - B_p$$

$$R_p = rg - \min(C_p, rg)$$

$$G_p = rg - R_p$$

$$C_p = C_p - G_p$$

$$M_p = M_p - R_p$$

$$Y_p = Y_p - R_p G_p.$$

The above-described sub-conversions performed for each dot produces a CMYK and a RGB for each dot.

At 426, these values for each dot are combined to produce a $CMYKK_p$RGB output. The combination is given by:

$$C = C_p + C_e - C_n$$

$$M = M_p + M_e - M_n$$

$$Y = Y_p + Y_e - Y_n$$

$$K = K_i$$

$$K_p = K_p + K_e - K_n$$

$$B = B_p + B_e - B_b$$

$$R = R_p + R_e - R_n$$

$$G = G_p + G_e - G_n.$$

The CMYK to $CMYKK_p$ RGB conversion 208 is now complete.

The $CMYKK_p$RGB output generated as a result of this conversion is provided as input to the hierarchical thresholding module 210 of FIG. 2. Since processing proceeds with respect to the various elements already discussed with respect to the embodiment of FIG. 2, a repeat discussion has been omitted.

Results demonstrate that the present method effectively diffuses pixel error and provides a comparable high-quality halftone output result. The method is computationally efficient and thus can be implemented in a bit-constrained environment such as an ASIC or FPGA placed in the image path of a color marking device or color management system. In one embodiment, the ASIC or FPGA iteratively processes the received CMYK input values and generates a halftone output result in either 4-channel CMYK space or 8-channel CMYKK$_p$RGB space depending on the color management system wherein the present pixel error diffusion method finds its implementation.

Figure 5:
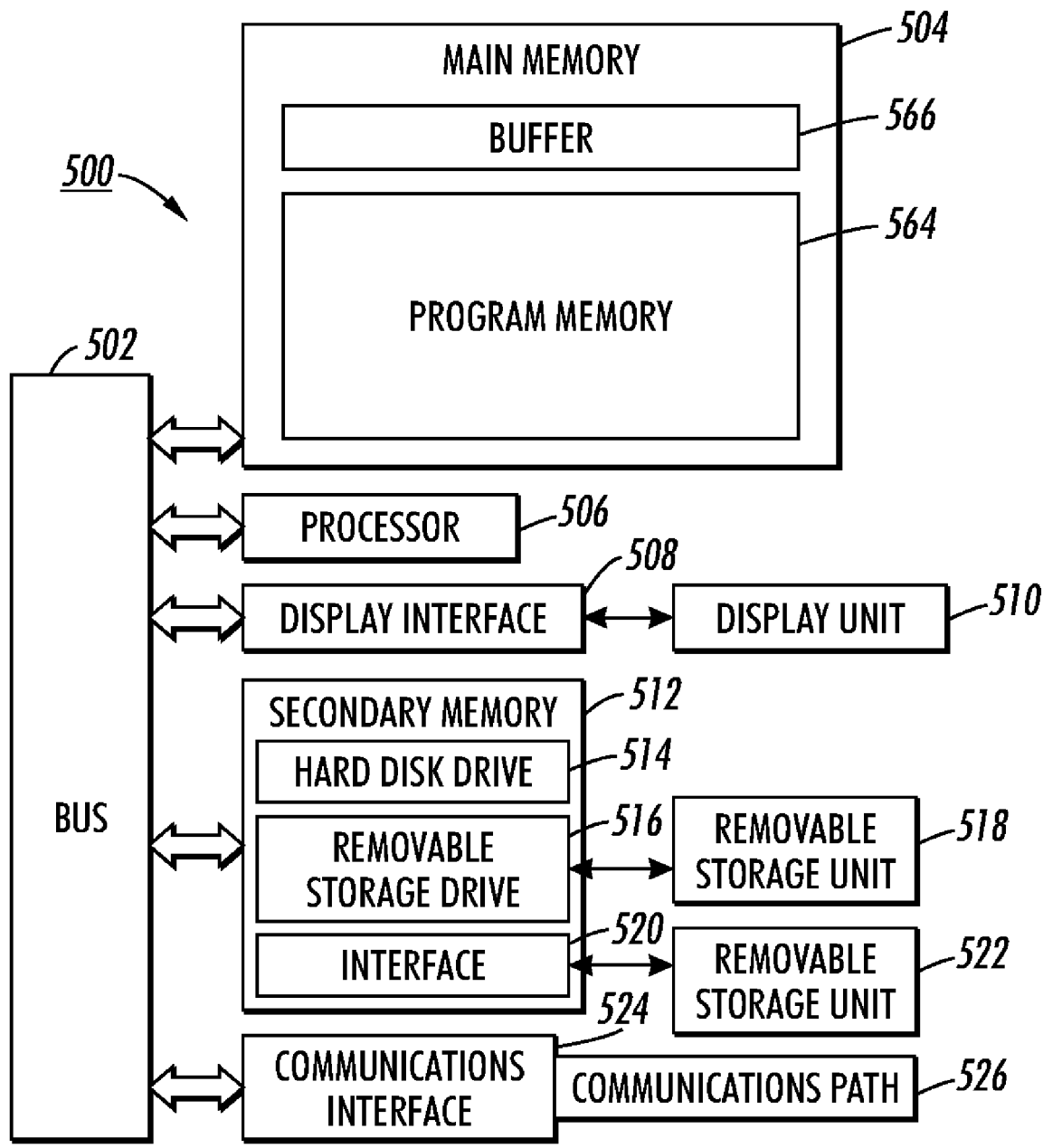
FIG. 5 is a block diagram of one example embodiment of a special purpose computer system useful for implementing one or more aspects of the present pixel error diffusion method.

Reference is now made to FIG. 5 which illustrates a block diagram of one example embodiment of a special purpose computer system useful for implementing one or more aspects of the present method.

Special purpose computer system 500 includes processor 506 for executing machine executable program instructions for performing one or more aspects of the present method. The processor is in communication with bus 502 (e.g., a backplane interface bus, cross-over bar, or data network) for receiving and sending data. The system includes main memory 504 for storing machine readable instructions. Main memory may comprise random access memory (RAM) to support reprogramming and flexible data storage. Buffer 566 stores data accessible by the processor. Program memory 564 stores program instructions. A display interface 508 forwards data from bus 502 to display 510. Secondary memory 512 includes a hard disk 514 and storage device 516 for reading/writing to removable storage unit 518, such as a floppy disk, magnetic tape, optical disk, etc. Secondary memory 512 further includes other mechanisms for allowing programs or other machine executable instructions to be loaded into the processor. Such mechanisms may include, for example, a storage unit 522 adapted to exchange data through interface 520. Examples of such mechanisms include a program cartridge and cartridge interface, a removable memory chip (such as an EPROM, PROM, etc.) and any associated sockets. Interface 520 enables the transfer of software and data from the storage unit to the processor. System 500 includes a communications interface 524 to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 526 which carries such signals and may be implemented using wire, cable, fiber optic, phone line, cellular link, RF, memory, or other means known in the arts.

Figure 6:
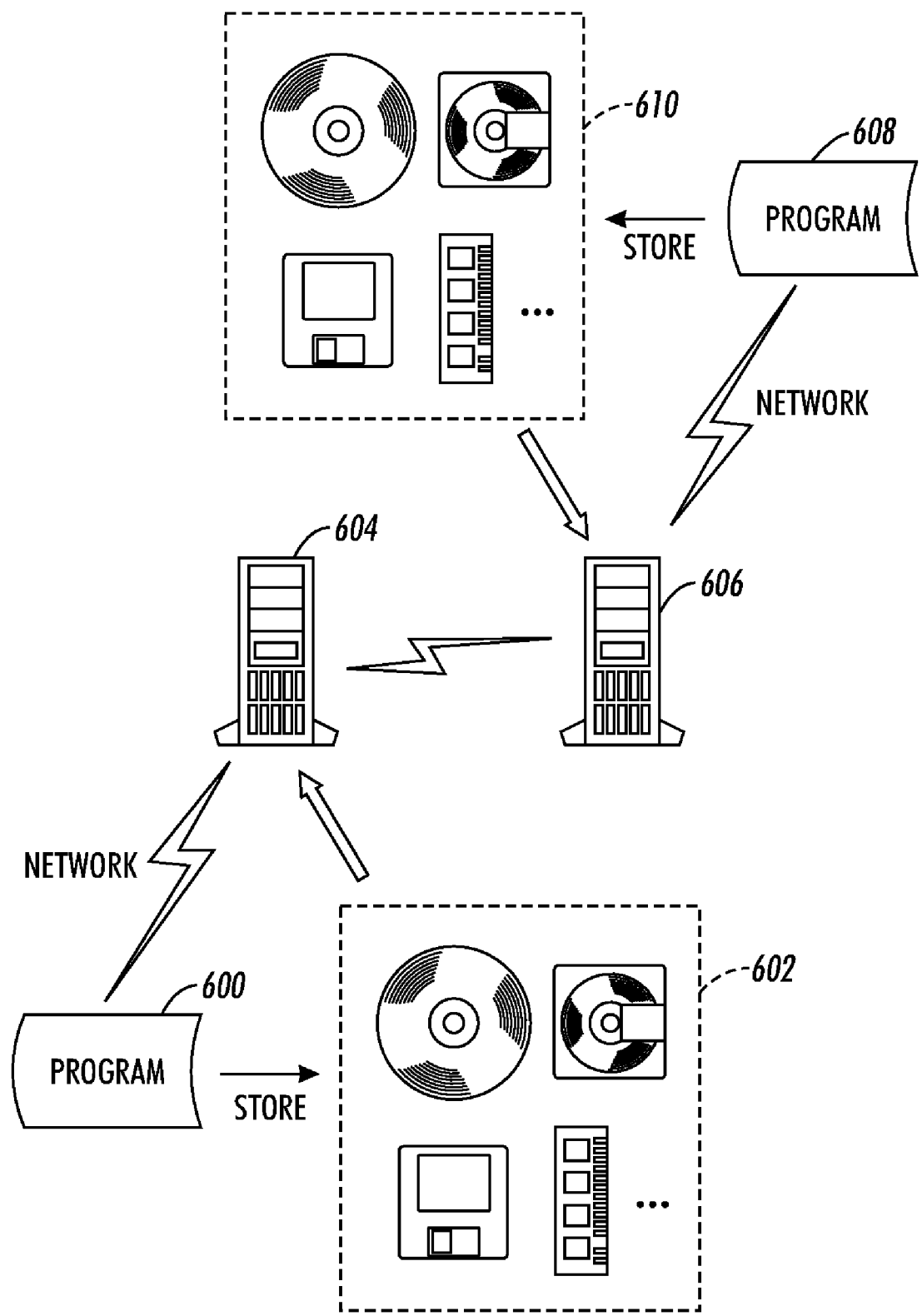
FIG. 6 is an explanatory diagram illustrating one example computer readable medium capable of storing machine readable instructions which, when mounted on a computer or a special purpose computer system, causes the system to perform one or more aspects of the present pixel error diffusion method.

Reference is now made to FIG. 6 which is an explanatory diagram illustrating one example of a computer readable storage medium capable of storing machine readable instructions which, when mounted on a computer or a special purpose computer system, causes the system to perform one or more aspects of the present pixel error diffusion method as described herein in detail. The machine readable instructions may be modified by one computer and transferred to another computer. In the illustrated embodiment, computer programs 600 for carrying out the present method are loaded on a computer-readable storage media 602 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 604 and transferred or otherwise communicated to computer 606. The program instructions can then be off-loaded to medium 608, in original form or modified, including data, and stored on media 610. The computer systems include processors or special purpose computers capable of executing machine readable program instructions for carrying out one or more aspects of the present method.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagram hereof are intended to be illustrative. Other operations, for example, may be added, modified, enhanced, condensed, integrated, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for diffusing pixel error in a halftoning process in a color management system, the method comprising:
   receiving an input CMYK ink coverage for each pixel in a color image; and
   performing, for each pixel in said color image, pixel-based adaptive processing comprising:
   adding an amount of ΔCMYK to said current pixel's input CMYK to generate a modified $C_iM_iY_iK_i$ input;
   dividing said modified $C_iM_iY_iK_i$ input into a positive dot portion $C_pM_pY_pK_p$, a negative dot portion $C_nM_nY_nK_n$, and an excess dot portion $C_eM_eY_eK_e$ and determining an amount of CMYK for each dot;

transforming said determined amount of CMYK for each dot to produce a $CMYKK_pRGB$ output;

hierarchically thresholding said $CMYKK_pRGB$ output to generate an output $(CMYKK_pRGB)_h$ halftone for the current pixel;

determining a difference between said $(CMYKK_pRGB)_h$ halftone and said $CMYKK_pRGB$ output to obtain a $\Delta CMYKK_pRGB$; and transforming said $\Delta CMYKK_pRGB$ to obtain an amount of $\Delta CMYK$ for the current pixel.

2. The method of claim 1, wherein determining said amount of CMYK for each dot comprises:

determining an amount of C, M, and Y of each positive and negative dots based on said modified $C_iM_iY_i$, and $K_n$ being a minimum of $C_nM_nY_n$;

determining a capacity of a space S at the current pixel location available to accommodate CMY based on said $K_i$ and said $K_n$;

determining $C_eM_eY_eK_e$ of said excess dot, said $C_eM_eY_e$ being an amount of CMY which cannot be settled inside of space S, and $K_e$ being a minimum of $C_eM_eY_e$;

removing said $C_eM_eY_e$ of said excess dot from said $C_pM_pY_p$;

determining an amount of $K_p$ based on said $C_pM_pY_p$ and said capacity of space S; and adjusting said CMY for each dot by subtracting each dot's respective K.

3. The method of claim 2, wherein said capacity of space S comprises:

$S=\max(0,100+K_n-K_i)$.

4. The method of claim 2, wherein transforming said determined amount of CMYK for each dot to produce said $CMYKK_pRGB$ output comprises:

determining a $R_nG_nB_n$ for said negative dot based on said adjusted $C_nM_nY_n$;

determining a $R_pG_pB_p$ for said positive dot based on said adjusted $C_pM_pY_p$;

determining a $R_eG_eB_e$ for said excess dot based on said adjusted $C_eM_eY_e$; and combining said adjusted CMYK and said RGB determined for each dot to produce said $CMYKK_pRGB$ output.

5. The method of claim 4, wherein combining said adjusted CMYK and said RGB determined for each dot to produce said $CMYKK_pRGB$ output comprises:

$C=C_p+C_e-C_n$;

$M=M_p+M_e-M_n$;

$Y=Y_p+Y_e-Y_n$;

$K=K_i$;

$K_p=K_p+K_e-K_n$;

$B=B_p+B_e-B_n$;

$R=R_p+R_e-R_n$; and $G=G_p+G_e-G_n$.

6. The method of claim 5, wherein said transforming said $\Delta CMYKK_pRGB$ to $\Delta CMYK$ comprises:

$C=K_p+G+B+C_p$;

$M=K_p+R+B+M_p$;

$Y=K_p+R+G+Y_p$;

$K=K_p$.

7. The method of claim 1, further comprising clipping each of said input CMY ink coverages to a maximum of 100-K.

8. The method of claim 1, further comprising transforming said output $(CMYKK_pRGB)_h$ halftone to produce an output $(CMYK)_h$ halftone result.

9. A system for diffusing pixel error in a halftoning process in a color management system, the system comprising:

a memory;

a storage medium capable of storing data;

a scanning device for scanning a color image; and a processor in communication with said storage medium, said memory, and said scanning device, said processor performing the method of:

receiving an input CMYK ink coverage for each pixel in said color image; and performing, for each pixel in said color image, pixel-based adaptive processing comprising:

adding an amount of $\Delta CMYK$ to said current pixel's input CMYK to generate a modified $C_iM_iY_iK_i$ input;

dividing said modified $C_iM_iY_iK_i$ input into a positive dot portion $C_pM_pY_pK_p$, a negative dot portion $C_nM_nY_nK_n$, and an excess dot portion $C_eM_eY_eK_e$ and determining an amount of CMYK for each dot;

transforming said determined amount of CMYK for each dot to produce a $CMYKK_pRGB$ output;

hierarchically thresholding said $CMYKK_pRGB$ output to generate an output $(CMYKK_pRGB)_h$ halftone for the current pixel;

determining a difference between said $(CMYKK_pRGB)_h$ halftone and said $CMYKK_pRGB$ output to obtain a $\Delta CMYKK_pRGB$; and transforming said $\Delta CMYKK_pRGB$ to obtain an amount of $\Delta CMYK$ for the current pixel.

10. The system of claim 9, wherein determining said amount of CMYK for each dot comprises:

determining an amount of C, M, and Y of each positive and negative dots based on said modified $C_iM_iY_i$, and $K_n$ being a minimum of $C_nM_nY_n$;

determining a capacity of a space S at the current pixel location available to accommodate CMY based on said $K_i$ and said $K_n$;

determining $C_eM_eY_eK_e$ of said excess dot, said $C_eM_eY_e$ being an amount of CMY which cannot be settled inside of space S, and $K_e$ being a minimum of $C_eM_eY_e$;

removing said $C_eM_eY_e$ of said excess dot from said $C_pM_pY_p$;

determining an amount of $K_p$ based on said $C_pM_pY_p$ and said capacity of space S; and adjusting said CMY for each dot by subtracting each dot's respective K.

11. The system of claim 10, wherein transforming said determined amount of CMYK for each dot to produce said $CMYKK_pRGB$ output comprises:

determining a $R_nG_nB_n$ for said negative dot based on said adjusted $C_nM_nY_n$;

determining a $R_p G_p B_p$ for said positive dot based on said adjusted $C_p M_p Y_p$;

determining a $R_e G_e B_e$ for said excess dot based on said adjusted $C_e M_e Y_e$; and combining said adjusted CMYK and said RGB determined for each dot to produce said $CMYKK_p RGB$ output.

12. The system of claim 11, wherein combining said adjusted CMYK and said RGB determined for each dot to produce said $CMYKK_p RGB$ output comprises:

$$C = C_p + C_e - C_n;$$

$$M = M_p + M_e - M_n;$$

$$Y = Y_p + Y_e - Y_n;$$

$$K = K_i;$$

$$K_p = K_p - K_n;$$

$$B = B_p + B_e - B_n;$$

$$R = R_p + R_e - R_n; \text{ and}$$

$$G = G_p + G_e - G_n.$$

13. The system of claim 9, further comprising clipping each of said input CMY ink coverages to a maximum of 100-K.

14. The system of claim 9, further comprising transforming said output $(CMYKK_p RGB)_h$ halftone to produce an output $(CMYK)_h$ halftone result.

15. A computer program product for diffusing pixel error in a halftoning process in a color management system, the computer program product comprising:

A non-transitory computer-readable medium for storing instructions that, when executed on a computer, cause the computer to perform a method comprising:

receiving an input CMYK ink coverage for each pixel in a color image; and performing, for each pixel in said color image, pixel-based adaptive processing comprising:

adding an amount of $\Delta$CMYK to said current pixel's input CMYK to generate a modified $C_i M_i Y_i K_i$ input;

dividing said modified $C_i M_i Y_i K_i$ input into a positive dot portion $C_p M_p Y_p K_p$, a negative dot portion $C_n M_n Y_n K_n$, and an excess dot portion $C_e M_e Y_e K_e$ and determining said amount of CMYK for each dot;

transforming said determined amount of CMYK for each dot to produce a $CMYKK_p RGB$ output;

hierarchically thresholding said $CMYKK_p RGB$ output to generate an output $(CMYKK_p RGB)_h$ halftone for the current pixel;

determining a difference between said $(CMYKK_p RGB)_h$ halftone and said $CMYKK_p RGB$ output to obtain a $\Delta CMYKK_p RGB$; and transforming said $\Delta CMYKK_p RGB$ to obtain an amount of $\Delta$CMYK for the current pixel.

16. The computer program product of claim 15, wherein determining said amount of CMYK for each dot comprises:

determining an amount of C, M, and Y of each positive and negative dots based on said modified $C_i M_i Y_i$, and $K_n$ being a minimum of $C_n M_n Y_n$;

determining a capacity of a space S at the current pixel location available to accommodate CMY based on said $K_i$ and said $K_n$;

determining $C_e M_e Y_e K_e$ of said excess dot, said $C_e M_e Y_e$ being an amount of CMY which cannot be settled inside of space S, and $K_e$ being a minimum of $C_e M_e Y_e$;

removing said $C_e M_e Y_e$ of said excess dot from said $C_p M_p Y_p$;

determining an amount of $K_p$ based on said $C_p M_p Y_p$ and said capacity of space S; and adjusting said CMY for each dot by subtracting each dot's respective K.

17. The computer program product of claim 16, wherein transforming said determined amount of CMYK for each dot to produce said $CMYKK_p RGB$ output comprises:

determining a $R_n G_n B_n$ for said negative dot based on said adjusted $C_n M_n Y_n$;

determining a $R_p G_p B_p$ for said positive dot based on said adjusted $C_p M_p Y_p$;

determining a $R_e G_e B_e$ for said excess dot based on said adjusted $C_e M_e Y_e$; and combining said adjusted CMYK and said RGB determined for each dot to produce said $CMYKK_p RGB$ output.

18. The computer program product of claim 17, wherein combining said adjusted CMYK and said RGB determined for each dot to produce said $CMYKK_p RGB$ output comprises:

$$C = C_p + C_e - C_n;$$

$$M = M_p + M_e - M_n;$$

$$Y = Y_p + Y_e - Y_n;$$

$$K = K_i;$$

$$K_p = K_p - K_n;$$

$$B = B_p - B_n;$$

$$R = R_p + R_e - R_n; \text{ and}$$

$$G = G_p + G_e - G_n.$$

19. The computer program product of claim 15, further comprising clipping each of said input CMY ink coverages to a maximum of 100-K.

20. The computer program product of claim 15, further comprising transforming said output $(CMYKK_p RGB)_h$ halftone to produce an output $(CMYK)_h$ halftone result.

* * * * *